US012566126B2

(12) United States Patent
Alqahtani et al.

(10) Patent No.: US 12,566,126 B2
(45) Date of Patent: Mar. 3, 2026

(54) DETERMINING CORROSION RATES

(71) Applicant: Saudi Arabian Oil Company, Dhahran (SA)

(72) Inventors: Abdulrahman Mohammed Alqahtani, Khobar (SA); Mazyad Alyami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 282 days.

(21) Appl. No.: 18/456,961

(22) Filed: Aug. 28, 2023

(65) Prior Publication Data

US 2025/0076178 A1      Mar. 6, 2025

(51) Int. Cl.
| | |
|---|---|
| *G01N 17/00* | (2006.01) |
| *G01B 11/06* | (2006.01) |
| *G01L 1/24* | (2006.01) |
| *G01N 17/04* | (2006.01) |

(52) U.S. Cl.
CPC ....... *G01N 17/006* (2013.01); *G01B 11/0616* (2013.01); *G01L 1/246* (2013.01); *G01N 17/04* (2013.01); *G01N 17/043* (2013.01)

(58) Field of Classification Search
CPC .... G01N 17/006; G01N 17/04; G01N 17/043; G01B 11/0616; G01L 1/246
See application file for complete search history.

(56) References Cited

U.S. PATENT DOCUMENTS

| | | | |
|---|---|---|---|
| 6,144,026 A | 11/2000 | Udd et al. | |
| 6,885,785 B2 | 4/2005 | Dunphy et al. | |
| 11,262,289 B1 | 3/2022 | Ohodnicki, Jr. et al. | |
| 11,519,894 B2 | 12/2022 | Teepe et al. | |
| 2003/0029232 A1 | 2/2003 | Felix et al. | |
| 2006/0049341 A1 | 3/2006 | Wang et al. | |
| 2007/0019898 A1* | 1/2007 | Chimenti | G01L 1/246 |
| | | | 385/12 |
| 2019/0129062 A1* | 5/2019 | Hoegerl | E21B 47/006 |
| 2021/0063301 A1* | 3/2021 | Anderson | G01N 17/043 |
| 2021/0148832 A1* | 5/2021 | Kvryan | G01N 21/8806 |
| 2022/0107170 A1 | 4/2022 | Chilukuri et al. | |
| 2023/0220957 A1* | 7/2023 | Alnaimi | F17D 5/00 |
| | | | 702/34 |

(Continued)

FOREIGN PATENT DOCUMENTS

| | | |
|---|---|---|
| AU | 2021221640 | 9/2022 |
| CN | 201382890 | 1/2010 |

(Continued)

OTHER PUBLICATIONS

CN-114088611-A, English Translation (Year: 2022).*

(Continued)

*Primary Examiner* — Ryan D Walsh
(74) *Attorney, Agent, or Firm* — Fish & Richardson P.C.

(57) ABSTRACT

Systems and methods for determining corrosion rates include a corrosion sensor. The corrosion sensor includes a corrodible layer having a front face and a back face opposite the front face; a fiber Bragg grating sensor layer having a front face and a back face opposite the front face, the front face of the fiber Bragg grating sensor layer coupled to the back face of the corrodible layer; and a corrosion resistant material covering the back face and edges of the fiber Bragg grating sensor layer.

20 Claims, 5 Drawing Sheets

(56)  References Cited

U.S. PATENT DOCUMENTS

2025/0224287 A1 * 7/2025 Fakiri .................. G01B 11/165

FOREIGN PATENT DOCUMENTS

| CN | 114088611 A * | 2/2022 | .......... G01N 17/006 |
| RU | 2805514 C2 * | 10/2023 | |
| WO | WO-2015200899 A1 * | 12/2015 | ............. G01N 17/02 |
| WO | WO-2021165709 A1 * | 8/2021 | ............. G01N 17/04 |

OTHER PUBLICATIONS

RU-2805514-C2, English Translation (Year: 2023).*
WO-2015200899-A1, English Translation (Year: 2015).*
WO-2021165709-A1, English Translation (Year: 2021).*
Abro et al., "Development of FBG pressure sensors using FDM technique for monitoring sleeping postures," Sensors and Actuators A: Physical, Jun. 2021, 331:112921, 8 pages.
Atanas Wall loss dependence on strained FBG sensors' simulated response, International Journal of Scientific & Engineering Research, Jun. 2016, 7(6):237-241, 5 pages.
Fan et al., "Review of fiber optic sensors for corrosion monitoring in reinforced concrete," Cement and Concrete Composites, Mar. 2021, 120:104029, 19 pages.
Fang et al., "Application of Embedded Fiber Bragg Grating (FBG) Sensors in Monitoring Health to 3D Printing Structures," IEEE Sensors Journal, Sep. 2016, 16(17):6604-6610, 7 pages.
Lu et al., "A Multifunctional Fiber Optic Sensor for Internal Corrosion Monitoring in Natural Gas Transmission Pipelines," NACE-11429, NACE International, Corrosion Conference & Expo, 2018, 12 pages.
Morison, "Remote Monitoring of Pipeline Corrosion Using Fiber Optic Sensors," NACE-08290, NACE International Corrosion Conference & Expo, 2018, 9 pages.
Tan et al., "Detection, visualization, quantification, and warning of pipe corrosion using distributed fiber optic sensors," Automation in Construction, Dec. 2021, 132(18):103953, 38 pages.

* cited by examiner

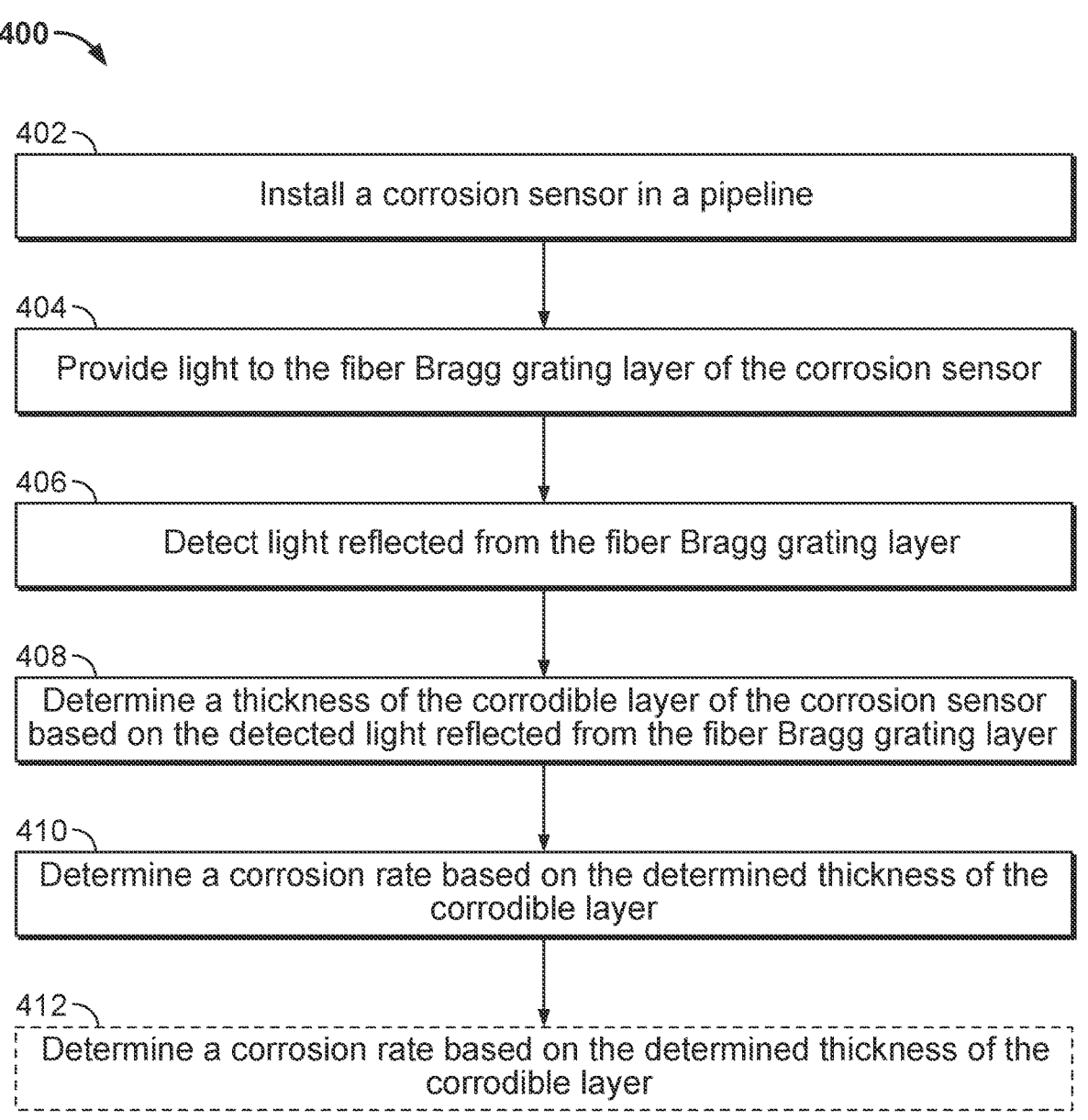

400

402 — Install a corrosion sensor in a pipeline

404 — Provide light to the fiber Bragg grating layer of the corrosion sensor

406 — Detect light reflected from the fiber Bragg grating layer

408 — Determine a thickness of the corrodible layer of the corrosion sensor based on the detected light reflected from the fiber Bragg grating layer 410 — Determine a corrosion rate based on the determined thickness of the corrodible layer 412 — Determine a corrosion rate based on the determined thickness of the corrodible layer

FIG. 4

DETERMINING CORROSION RATES

TECHNICAL FIELD

This disclosure relates to determining rates of corrosion of materials, for example, in oil and gas pipelines.

BACKGROUND

Corrosion is a process in which a material deteriorates through chemical or electrochemical reactions with the environment in which the material is placed. For example, iron deteriorates through the formation of iron oxides (e.g., rust) in the presence of oxygen. The rate at which the material deteriorates can depend on many factors including the material, the chemical composition of the environment, and any corrosion protective or preventative measures being used.

SUMMARY

This disclosure describes systems and methods for determining corrosion rates by measuring thickness loss during exposure of a corrosion sensor to a corrosive environment. The corrosion sensor includes a corrodible layer (e.g., a corrosion coupon) and a fiber Bragg grating (FBG) sensor coupled to the corrodible layer. A front face of the corrodible layer is exposed to the environment (e.g., the corrosive environment). The back face of the corrodible layer is coupled to the FBG sensor. The FBG sensor, and back face and sides of the corrodible layer are typically encapsulated in a corrosion resistant material. As the corrodible layer deteriorates, changes in strain in the FBG sensor alter the wavelength of light reflected from the internal gratings of the FBG sensor. Based on the wavelength shift, the thickness of the corrodible layer can be determined.

Implementations of the systems and methods of this disclosure can provide various technical benefits. The corrosion sensor can detect thickness changes during the exposure of the corrosion sensor to the corrosive environment providing more reliable estimates of corrosion rates than basing the corrosion rate on the thickness or weight of a corrosion coupon before and after exposure to the corrosive environment. Data from the corrosion sensor can be transmitted to a remote device enabling remote monitoring of the status of the corrosion sensor and reducing trips to sensor locations by operating personnel to check the progress of corrosion coupons installed in a pipeline. The corrosion data can be transmitted in real-time or near real-time to the remote device. The in-situ corrosion measurements can be validated with before and after measurements of the corrosion sensor.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 4 is a flow chart of a method for determining a corrosion rate.

Like reference symbols in the various drawings indicate like elements.

DETAILED DESCRIPTION

This specification describes methods and systems for determining corrosion rates by measuring thickness loss of a corrosion sensor during exposure of the corrosion sensor to a corrosive environment. A corrosive environment is an environment that may contain substances that can chemically or electrochemically react with a material of the corrosion sensor. The corrosion sensor includes a corrodible layer (e.g., a corrosion coupon) and a FBG sensor coupled to the corrodible layer. A front face of the corrodible layer is exposed to the corrosive environment. The back face of the corrodible layer is coupled to the FBG sensor. The FBG sensor, and back face and sides of the corrodible layer are typically encapsulated in a corrosion resistant material. As the corrodible layer deteriorates, changes in strain in the FBG sensor alter the wavelength of light reflected from the internal gratings of the FBG sensor. Based on the wavelength shift, the thickness of the corrodible layer can be determined.

Figures 1A, 1B, 1C, 1D, 1E:
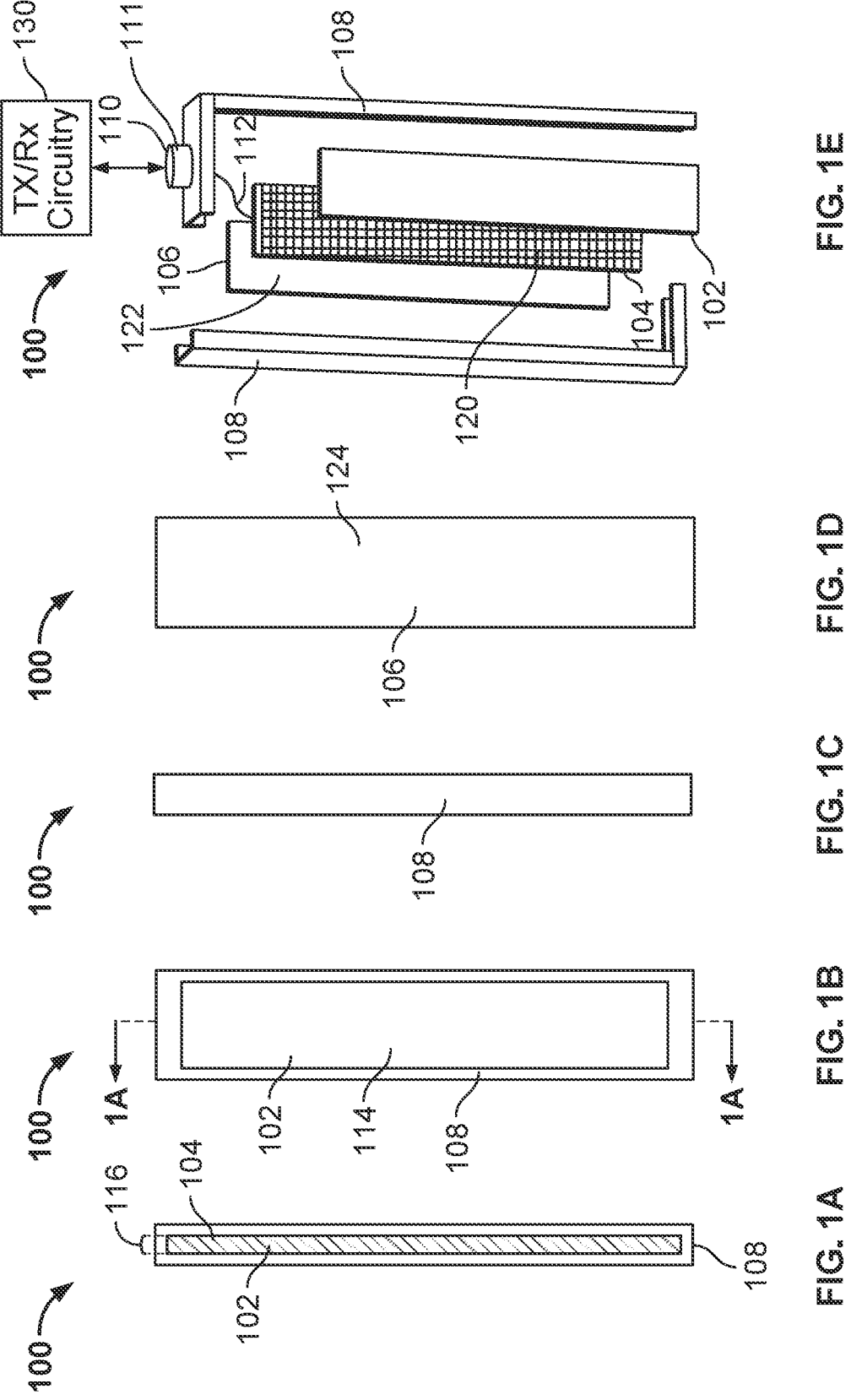
FIGS. 1A-1E are cross-section, front, back, side and exploded views of a corrosion sensor.

FIGS. 1A-1E are views of an example corrosion sensor 100. FIG. 1A is a cross section view. FIG. 1B is a front view. FIG. 1C is a side view. FIG. 1D is a back view, and FIG. 1E is an exploded view. The corrosion sensor 100 includes a corrodible layer 102, an FBG layer 104 coupled to the corrodible layer 102, a corrosion resistant layer 106 covering the FBG layer 104 opposite the corrodible layer 102 and corrosion resistant side couplers 108 coupling the corrodible layer 102, the FBG layer 104 and the corrosion resistant layer 106. The corrosion resistant layer 106 and the corrosion resistant side couplers 108 protect the FBG layer 104 from the corrosive environment in which the corrosion sensor 100 is placed during use. As depicted in FIG. 1E, the corrosion sensor 100 includes an integrated light source 110, and a light detector 111 both of which are optically coupled to the FBG layer 104 by an optical fiber 112. The integrated light source 110 can include a power source (e.g., a battery). In some implementations, the light source 110 receives power from an external power supply.

The corrodible layer 102 can be, for example, a corrosion coupon. The corrodible layer 102 has a generally rectangular shape when viewed from the front (e.g., FIG. 1B). The front face 114 of the corrodible layer 102 is configured to be exposed to the corrosive environment when the corrosion sensor 100 is installed in a pipeline. The back face is opposite the front face. The initial thickness 116 (e.g., the thickness before being exposed to a corrosive environment) of the corrodible layer 102 can be, for example, 1 mm or more, 5 mm or more, 10 mm or less. The initial thickness 116 can correspond to the wall thickness of the pipeline in which the sensor will be installed. The corrodible layer 102 includes a metal material with a known chemical composition, appearance, density, size, and weight. For example, the corrodible layer 102 can be made from carbon steel, stainless steel, or titanium. In some implementations, the corrodible layer 102 includes a material corresponding to the material of a pipeline.

The FBG layer 104 has a front face 120 and a back face opposite the front face 120. The front face 120 of the FBG layer is coupled to the back face of the corrodible layer 102. The FBG layer 104 can be attached to the corrodible layer 102 by, for example, an adhesive. In some implementations, the FBG layer 104 includes a layer of textile based FBG sensors coupled to the corrodible layer 102. For example, the FBG sensors can be included in a yarn-like textile that is attached to the surface of the corrodible layer 102. The optical axis of the FBG sensors can be parallel with the back face of the corrodible layer 102. In some implementations, the FBG layer 104 is coupled to the corrodible layer 102 by an adhesive. In some implementations, the FBG layer 104 includes multiple FBG sensors. The multiple FBG sensors can be distributed across the face of the corrodible layer to provide strain measurements corresponding to metal loss from multiple locations on the corrodible layer.

The corrosion resistant layer 106 has a front face 122 and a back face 124 opposite the front face 122. The front face of the corrosion resistant layer 106 faces the back face of the FBG layer 104. The corrosion resistant layer 106 can be made of a polymer material such as epoxy, polyethylene (PE), or polyvinyl chloride (PVC). The corrosion resistant side couplings 108 can be made of the same material as the corrosion resistant layer. The corrosion resistant layer 106 and the corrosion resistant side couplings 108 function to encapsulate the FBG layer 104 and isolate the FBG layer 104 from a corrosive environment in which the corrosion sensor 100 is used. The corrosion resistant layer 106 and the corrosion resistant side couplings 108 can be sealed together to form a fluid impermeable barrier to isolate the FBG layer 104 from the corrosive environment. In some implementations, the corrosion resistant side couplings 108 cover a portion of the front face 114 of the corrodible layer.

The corrosion sensor 100 includes transmitter (Tx) and receiver (Rx) circuitry 130. The Tx/Rx circuitry 130 includes at least one processor and memory storing instructions to be executed by the processor. The Tx/Rx circuitry 130 can receive electronic signals from an external device (e.g., a data acquisition module, a computing system, a remote device). The Tx/Rx circuitry 130 can forwards signals received to the light source 110. The Tx/Rx circuitry 130 can receive light detections from the light detector 111 and forward the light detections to the external device. In some implementations, the Tx/Rx circuitry 130 can process data received from the light detector 111.

Figures 2, 3:
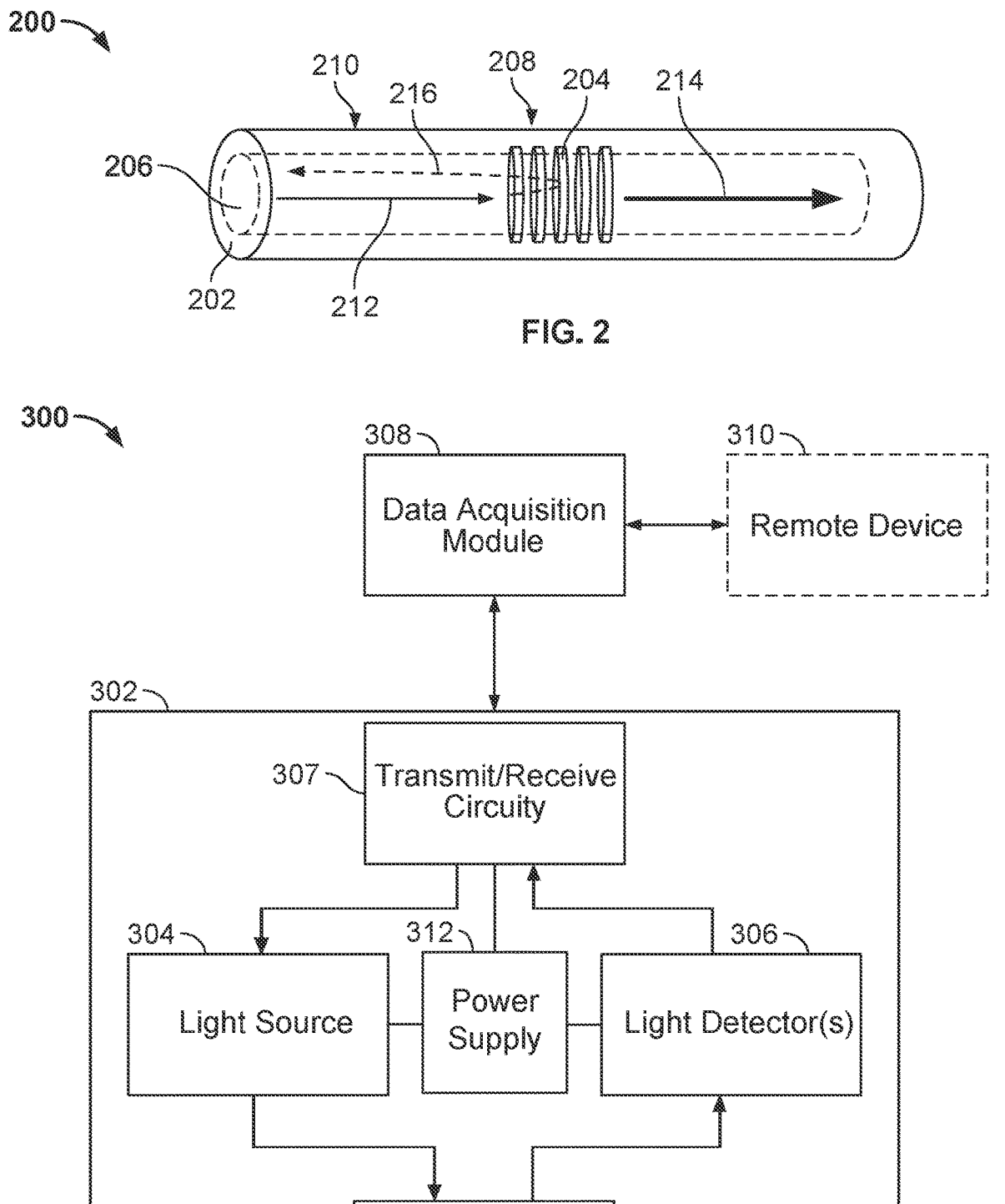
FIG. 2 is a schematic of a fiber Bragg grating.
FIG. 3 is a block diagram of a corrosion sensor system.

FIG. 2 is a schematic diagram of a fiber Bragg grating 200. The FBG layer 104 includes one or more FBGs. The FBG 200 is a microstructure 204 defined within the core 206 of an optical fiber 202. The microstructure 204 (e.g., the grating) includes a periodic modulation of the refractive index of the underlying material of the optical fiber 202. The FBG 200 includes a sensing portion 208 (e.g., the microstructure 204) and a non-sensing portion 210. The non-sensing portion guides light 212 from a light source through the optical fiber to the sensing portion 208. The light 212 then encounters the microstructure 204 in the sensing portion 208. A portion of the light 212 passes through the optical fiber (e.g., transmitted light 214). A second portion of the light 212 is reflected from the microstructure 204 (e.g., reflected light 216). The wavelength of the reflected light 216 depends on the microstructure 204. If the optical fiber 202 experiences strain (e.g., the optical fiber is stretched or compressed), then the effective refractive index of the microstructure changes and the wavelength of the reflected light 216 is altered. The wavelength of the reflected light 216 depends on the wavelength of the transmitted light 214.

FIG. 3 is a block diagram of a system 300 for determining a corrosion rate. The system 300 includes a corrosion sensor 302 (e.g., corrosion sensor 100) that includes a corrodible layer 303a coupled to an FBG layer 303b, a light source 304 and at least one light detector 306 optically coupled to the FBG layer 303b. The corrosion sensor 302 also includes transmitter and receiver circuitry 307 and a power supply 312. The power supply 312 provides electrical power to the light source 304, the light detector 306, and the transmitter and receiver circuitry 307. The system 300 includes a data acquisition module 308 communicatively coupled to the transmitter and receiver circuitry 307. The data acquisition module 308 can also be communicatively coupled to a remote device 310 (e.g., over a wireless network).

The light source 304 can be, for example, a light emitting diode (LED) or a laser. The light source 304 can be a pulsed light source (e.g., emitting 1 or more pulses per second, emitting 1 pulse every 2 or more seconds). The light source 304 can be a continuous light source. The amplitude, frequency, and phases of the light source are stable and free from fluctuation in order to have efficient transmission. In some implementations, the wavelength of the light emitted from the light source is infrared. For example, light having a wavelength of 1550 nm.

The light detector 306 can be, for example, a photodiode, a photomultiplier tube, or a spectrometer. The light detector can detect changes in light intensity resulting from strain changes in the FBG layer 303b caused by corrosion of the corrodible layer 303a. The light detector 306 can include a light wavelength analyzer to determine the wavelength of the reflected light. The light detector 306 can be optically coupled to more than one FBG.

The data acquisition module 308 includes at least one processor. The data acquisition module 308 can send electronic signals to the light source 304. The light source 304 transmits light to the FGB layer 303b. Light reflected from the FBG layer 303b is transmitted to the light detector 306. The light detector 306 can transmit electronic signals to the data acquisition module 308 via the transmitter and receiver circuitry 307. The transmitter and receiver circuitry 307 can be located on the outside of the pipeline with a direct connection to the light detector 306 and/or FBG layer 303b, for example, via optical fiber or electrical wires.

The data acquisition module 308 can include transmission and reception circuitry to transmit data to/from the corrosion sensor 302 and/or the remote device 310. The remote device 310 can be, for example, a data processing system, a server, a computer, a laptop, a tablet or a smartphone. The data acquisition module 308 can receive commands from the remote device 310 (e.g., commands to collect data from the corrosion sensor). The data acquisition module 308 can transmit data to the remote device (e.g., data collected from the corrosion sensor 302, status of the data acquisition module 308). The data transmission can occur via a wireless network (e.g., a cellular network) or a wired network In some implementations, the data acquisition module 308 processes the data received from the corrosion sensor 302 before transmitting the data to the remote device 310. For example, the data acquisition module 308 can receive detections of reflected light from the light detector 306, and based on the received detections, the data acquisition module 308 can determine a thickness of the corrodible layer 303a.

FIG. 4 is a flow chart of an example method 400 for determining a corrosion rate in a pipeline. A corrosion sensor (e.g., corrosion sensor 100) is installed in the pipeline (step 402). The corrosion sensor can be installed, for example, in proximity to an area of the pipeline where corrosion of the pipeline is active. Prior to installation, the weight and wall thickness of the corrodible layer of the corrosion sensor can be measured for later comparison. The corrosion sensor also includes an FBG layer which can sense surface strain when coupled to the corrodible layer.

The method 400 proceeds by providing light to the FBG layer of the corrosion sensor (step 404). The light can be provided, for example, by an integrated light source (e.g., light source 110 or light source 304). The light source is activated to provide light to the FBG layer upon receipt of an electrical signal from a data acquisition module. In some implementations the light source is activated by a signal received from a remote device. The light from the light source is transmitted to the FBG via, for example, optical fibers. The light can be provided to the FBG layer on a periodic or repeating time basis.

Light reflected from the FBG layer is detected (step 406). The detection of the light can include a measurement of the wavelength of the reflected light. The light can be detected, for example, by a photodiode, spectrometer, or photomultiplier tube.

A thickness of the corrodible layer of the corrosion sensor is determined based on the detected light reflected from the FBG layer (step 408). The wavelength of the reflected light ($\lambda_B$) is sensitive to strain. where a change in strain in the gratings will be detected as a change in the wavelength of the reflected light, $\lambda_B$. The wavelength $\lambda_B$ can be expressed by $\lambda_B = 2\Lambda\eta_{eff}$, where $\Lambda$ is the spatial period of the grating and $n_{eff}$ is the effective refractive index of the fiber core. The strain variation can directly lead to wavelength shift of the FBG since tension or compression of the FBG can change the period of the microstructure defined in the FBG changing the pitch and refractive index accordingly. The wavelength shift can be quantified as $\Delta\lambda_B = \lambda_B - \lambda_{B0}$, where $\lambda_{B0}$ is the initial wavelength of reflected light.

The shifted wavelength of the reflected light (e.g., Bragg wavelength) produced by the imposed strain with a constant temperature is given by $$\Delta\lambda_B = \lambda_B(1 - P_e)\Delta\varepsilon,$$

where $P_e$ is a strain optic constant and $\Delta\varepsilon$ is the change in the strain. The relation between coupon thickness and induced strain can be derived from the bending stress formula for a rectangular cross section equation with an assumption is made that flow is constant and strain in the corrosion coupon surface will be fully converted to the strain in the FBG:

$$\sigma = E\varepsilon = 3PL/2bt^2,$$

where E is the elastic modulus of the material of the corrodible layer of the corrosion sensor, P is the distributed load acting on the corrosion sensor from the pressure of the fluid in the pipe, L is the span length of certain loss, b is the width of the loss, and t is the coupon thickness. For example, L is the length of a corroded region on the corrodible layer, and b is the width of the corroded region.

At an initial stage (e.g., before any corrosion of the corrodible layer occurs) the strain and thickness are known, and the equation can be expressed by:

$$E\varepsilon_0 = \frac{3PL}{2bt_0^2},$$

where $t_0$ is the initial thickness and $\varepsilon_0$ is the initial strain due to the pressure loading. The values of P, L, and b are constant values, which through rearrangement of the above equation yields a constant factor of N, $$N = E\varepsilon_0 t_0^2 = \frac{3PL}{2b}$$

A strain increase due to losses in the thickness can be expressed by:

$$E\varepsilon_1 = \frac{N}{t_1^2},$$

where $t_1$ is the thickness of the coupon at time 1. This equation can be solved for the thickness of the corrodible layer as $$t_1 = \sqrt{N/E\varepsilon_1}.$$

In implementations with multiple FBG sensors in the FBG layer of the corrosion sensor, these equations can be applied to determine the thickness of the corrodible layer at multiple locations. For example, multiple FBG sensors can be distributed across the back face of the corrodible layer. The multiple FBG sensors can detect variations in the strain of the corrodible layer resulting from non-uniform corrosion across the front face of the corrodible layer. The multiple FBG sensors can be optically coupled to a single light detector.

Based on the determined thickness, a corrosion rate can be determined (step 410). For example, a corrosion rate can be determined based on the initial thickness of the corrosion coupon, the determined thickness after exposure to the corrosive environment of the pipeline and the elapsed time of exposure of the coupon. In some implementations, the thickness of the corrodible layer is determined at multiple instances in time. In these implementations, the corrosion rate can be determined between based on the determined thickness at the multiple instances of time. A change in the rate of corrosion can be determined when multiple corrosion rates are determined. A change in the rate of corrosion can indicate, for example, the length of time for corrosion to begin (e.g., corrosion onset).

A data acquisition module (e.g., data acquisition module 308) can transmit the determined corrosion rate and the determined thickness to a remote device over a wireless network (step 412). The data acquisition module can transmit the data continuously or on a periodic schedule (e.g., once or more per second, once or more per minute, once or more per hour). The transmission of data allows remote monitoring of the corrosion of the corrosion sensor.

The corrosion sensor can be removed from the pipeline after the corrosion sensor has been exposed to the corrosive environment for a specified time (e.g., 1 month or more, 3 months or more, 6 months or more). The removed corrosion sensors can be subjected to examination. For example, to estimate the rate, type, and severity of corrosion damage, observations and data produced from the recovered coupons are submitted to an optical examination and a weight loss study. The corrosion sensor can be weighed, and an amount of material lost determined as compared with the initial weight of the corrosion sensor. The data collected from the analysis of the corrosion sensor after removal from the pipeline can be compared with the data acquired while the corrosion sensor was installed in the pipeline providing a validation method for the data generated by the corrosion sensor.

Figures 5A, 5B:
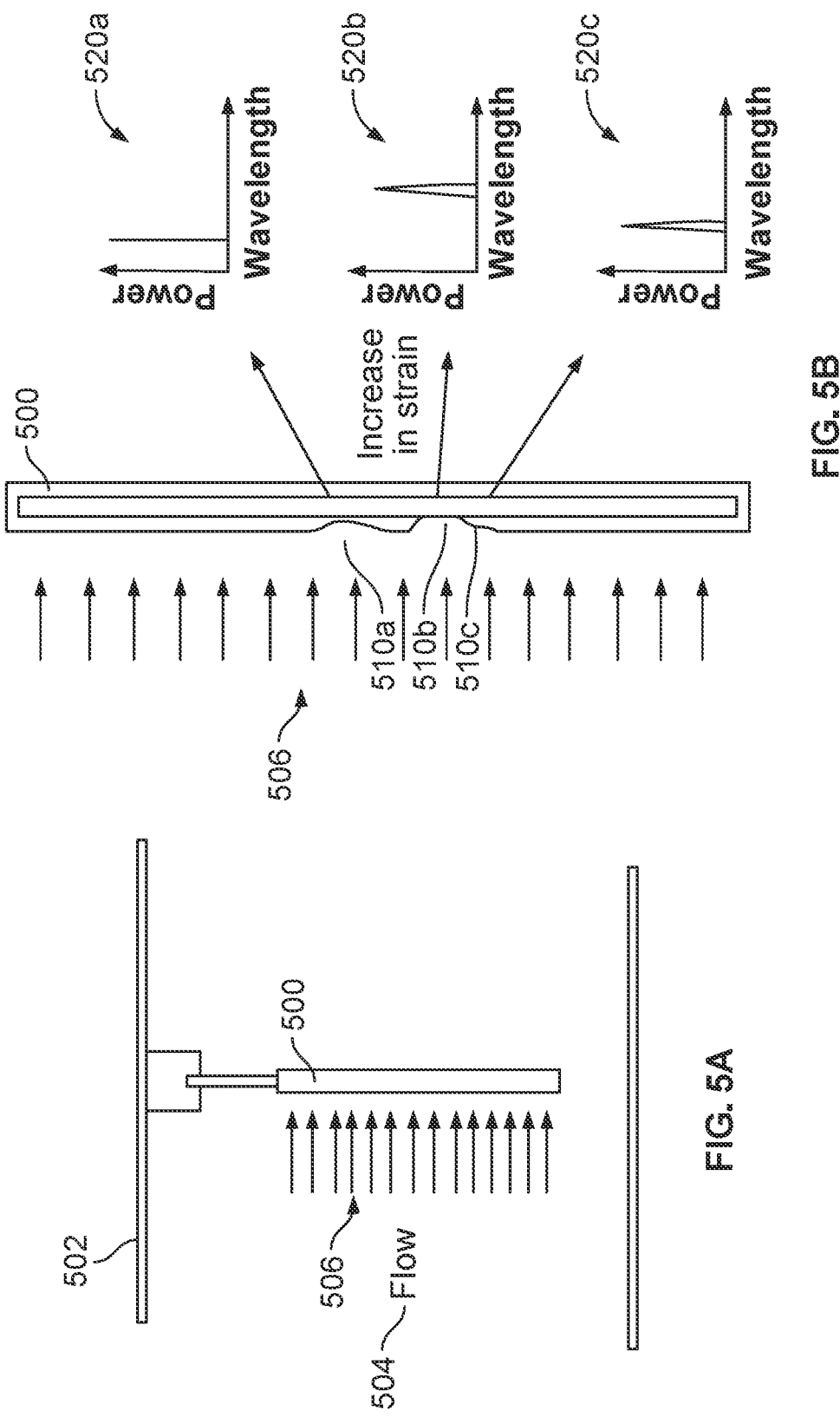
FIG. 5A illustrates a corrosion sensor installed in a pipeline.
FIG. 5B illustrates corrosion of the corrosion sensor altering wavelengths of light reflected by strained FBG sensors.

FIGS. 5A-5B illustrate an example implementation of the method 400. The corrosion sensor 500 is installed in a pipeline 502. The fluid flow 504 moves at a constant rate in the pipeline exerting a constant, evenly distributed pressure load 506 on the corrosion sensor 500. When the surface of the corrosion sensor 500 deteriorates, the strain will change at the location of the loss. In FIG. 5B, three areas of loss 510a-c are illustrated. The change in strain caused by the locally reduced thickness of the corrosion sensor 500 causes elongation of the optical fiber and FBG at the corresponding location on the back face of the corrodible layer. A change in the fiber strain which varies the grating pitch will change the Bragg wavelength at that location. Illustrative plots 520a-c depict the shift in the reflected wavelength of light corresponding to the areas of loss 510a-c. The shift in the wavelength can be related to the strain of the optical fiber and the thickness of the corrodible layer at the corresponding area of loss 510a-c can be determined.

Table 1 below gives properties of a steel coupon (e.g., a corrodible layer) and an example FBG sensor. Table 2 shows values calculated based on the above equations to determine a thickness loss based on the shifted wavelength. In this example, after material loss, the wavelength shifts by 3 nm corresponding to a 0.0065 mm loss of thickness.

TABLE 1

| Material properties | | | |
|---|---|---|---|
| Coupon Properties | | Fiber Properties | |
| Modulus (M) | 210000 N/mm$^2$ | effective index ($\eta_{eff}$) | 1.4455 |
| Thickness(t) | 10 mm | strain optic constant ($P_e$) | 0.2374 |

TABLE 2

| | $\lambda_{B0}$ | $\lambda_B$ | $\Delta\lambda_B$ | $\varepsilon_0$ | $\varepsilon_n$ | N | $t_n$ |
|---|---|---|---|---|---|---|---|
| Thickness reduction calculations | | | | | | | |
| Initial stage (No loss) | 0 nm | 1550 nm | 1550 nm | 0 nm | 7.69 | 1.61*10$^8$ | 10 mm |
| When Loss Occur | 1550 nm | 1553 nm | 3 nm | 7.69 nm | 7.70 | 1.61*10$^8$ | 9.9935 mm |

Figure 6:
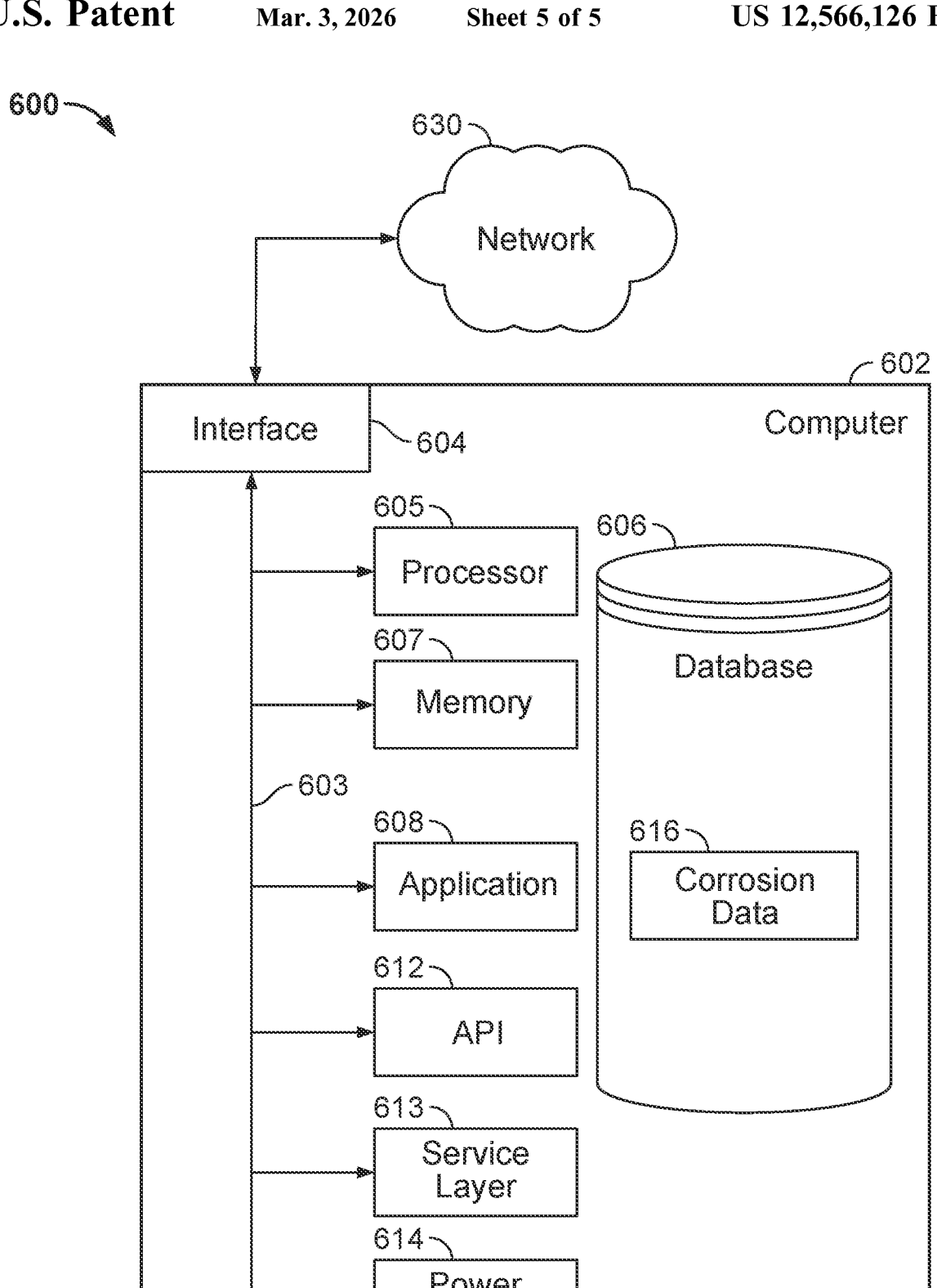
FIG. 6 is a block diagram illustrating an example computer system used to provide computational functionalities associated with described algorithms, methods, functions, processes, flows, and procedures according to some implementations of the present disclosure.

FIG. 6 is a block diagram of an example computer system 600 (e.g., data processing module 308 or remote device 310) used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602.

The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, the database 606 can hold corrosion data 616. The database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

Examples

In an example implementation, a corrosion sensor includes a corrodible layer having a front face and a back face opposite the front face; a fiber Bragg grating sensor layer having a front face and a back face opposite the front face, the front face of the fiber Bragg grating sensor layer coupled to the back face of the corrodible layer; and a corrosion resistant material covering the back face and edges of the fiber Bragg grating sensor layer.

In an aspect combinable with the example implementation, the corrodible layer includes a metal material corresponding to a metal material of a pipeline.

In another aspect combinable with any of the previous aspects, the corrodible layer comprises steel.

In another aspect combinable with any of the previous aspects, the corrosion resistant material comprises a polymer material resistant to corrosion caused by a pipeline environment.

In another aspect combinable with any of the previous aspects, the fiber Bragg grating sensor layer comprises at least one layer of textile-based fiber Bragg grating sensors.

In another aspect combinable with any of the previous aspects, the fiber Bragg grating sensor layer is coupled to the back face of the corrodible layer by an adhesive.

Another aspect combinable with any of the previous aspects, further includes an integrated light source optically coupled to the fiber Bragg grating sensor layer.

Another aspect combinable with any of the previous aspects, further includes an optical amplifier optically coupled to the fiber Bragg grating sensor layer.

Another aspect combinable with any of the previous aspects, further includes a light detector optically coupled to the fiber Bragg grating sensor layer.

In another example implementation, a corrosion sensing system includes a corrosion sensor including a corrodible layer having a front face and a back face opposite the front face; a fiber Bragg grating sensor layer having a front face and a back face opposite the front face, the front face of the fiber Bragg grating sensor layer coupled to the back face of the corrodible layer; a corrosion resistant layer covering the back face of the fiber Bragg grating sensor layer; and a corrosion resistant material coupled to edges of the corrodible layer and the fiber Bragg grating sensor layer; a light source coupled to the fiber Bragg grating sensor layer; at least one light detector coupled to the fiber Bragg grating sensor layer; and a data acquisition module including at least one processor communicatively coupled to the corrosion sensor.

In an aspect combinable with the example implementation, the light source includes a light emitting diode.

In another aspect combinable with any of the previous aspects, the data acquisition module further includes a memory storing instruction that when executed cause performance of operations including generating a control signal to activate the light source to provide light to the fiber Bragg grating sensor layer; receiving, from the at least one light detector, detections of light reflected by the fiber Bragg grating sensor layer; determining a wavelength of the light reflected by the fiber Bragg grating sensor layer; and determining a thickness of the corrodible layer based on the determined wavelength of light.

In another aspect combinable with any of the previous aspects, the operations further include transmitting the determined thickness of the corrodible layer to a remote device via a wireless network.

In another aspect combinable with any of the previous aspects, the corrosion sensor further includes transmitter and receiver circuitry communicatively coupled with the light source, the at least one light detector, and the data acquisition module.

In another example implementation, a method for determining a corrosion rate in a pipeline includes installing a corrosion sensor in a pipeline, the corrosion sensor comprising a corrodible layer and a fiber Bragg grating layer coupled to the corrodible layer; providing light to the fiber Bragg grating layer; detecting light reflected from the fiber Bragg grating layer; determining a thickness of the corrodible layer based on the detected light reflected from the fiber Bragg grating layer; and determining a corrosion rate based on the determined thickness of the corrodible layer.

An aspect combinable with the example implementation includes transmitting the determined thickness and the determined corrosion rate to a remote device via a wireless network.

In another aspect combinable with any of the previous aspects, the transmitting occurs at least once per hour during operation of the corrosion sensor.

Another aspect combinable with any of the previous aspects, further includes removing the corrosion sensor from the pipeline; weighing the corrosion sensor; and determining an amount of material lost from the corrosion sensor due to corrosion.

Another aspect combinable with any of the previous aspects, further includes validating the determined corrosion rate by comparing the determined corrosion rate and the determined amount of material lost.

In another aspect combinable with any of the previous aspects, determining a thickness of the corrodible layer includes determining the thickness at two or more instances in time; and determining a corrosion rate is based on the determined thickness at two or more instances in time.

What is claimed is:

1. A corrosion sensor comprising:
   a corrodible layer having a front face and a back face opposite the front face;
   a fiber Bragg grating sensor layer having a front face and a back face opposite the front face, the front face of the fiber Bragg grating sensor layer coupled to the back face of the corrodible layer; and
   a corrosion resistant material covering the back face and edges of the fiber Bragg grating sensor layer.

2. The corrosion sensor of claim 1, wherein the corrodible layer comprises a metal material corresponding to a metal material of a pipeline.

3. The corrosion sensor of claim 2, wherein the corrodible layer comprises steel.

4. The corrosion sensor of claim 1, wherein the corrosion resistant material comprises a polymer material resistant to corrosion caused by a pipeline environment.

5. The corrosion sensor of claim 1, wherein the fiber Bragg grating sensor layer comprises at least one layer of textile-based fiber Bragg grating sensors.

6. The corrosion sensor of claim 1, wherein the fiber Bragg grating sensor layer is coupled to the back face of the corrodible layer by an adhesive.

7. The corrosion sensor of claim 1, further comprising an integrated light source optically coupled to the fiber Bragg grating sensor layer.

8. The corrosion sensor of claim 7, further comprising an optical amplifier optically coupled to the fiber Bragg grating sensor layer.

9. The corrosion sensor of claim 8, further comprising a light detector optically coupled to the fiber Bragg grating sensor layer.

10. A corrosion sensing system comprising:
   a corrosion sensor comprising:
   a corrodible layer having a front face and a back face opposite the front face;
   a fiber Bragg grating sensor layer having a front face and a back face opposite the front face, the front face of the fiber Bragg grating sensor layer coupled to the back face of the corrodible layer;
   a corrosion resistant layer covering the back face of the fiber Bragg grating sensor layer; and
   a corrosion resistant material coupled to edges of the corrodible layer and the fiber Bragg grating sensor layer;
   a light source coupled to the fiber Bragg grating sensor layer;
   at least one light detector coupled to the fiber Bragg grating sensor layer; and
   a data acquisition module comprising at least one processor communicatively coupled to the corrosion sensor.

11. The corrosion sensing system of claim 10, wherein the light source comprises a light emitting diode.

12. The corrosion sensing system of claim 10, wherein the data acquisition module further comprises a memory storing instruction that when executed cause performance of operations comprising:
   generating a control signal to activate the light source to provide light to the fiber Bragg grating sensor layer;

receiving, from the at least one light detector, detections of light reflected by the fiber Bragg grating sensor layer;

determining a wavelength of the light reflected by the fiber Bragg grating sensor layer; and determining a thickness of the corrodible layer based on the determined wavelength of light.

13. The corrosion sensing system of claim 12, wherein the operations further comprise transmitting the determined thickness of the corrodible layer to a remote device via a wireless network.

14. The corrosion sensing system of claim 10, wherein the corrosion sensor further comprises transmitter and receiver circuitry communicatively coupled with the light source, the at least one light detector, and the data acquisition module.

15. A method for determining a corrosion rate in a pipeline, the method comprising:

installing a corrosion sensor in a pipeline, the corrosion sensor comprising a corrodible layer having a front face and a back face opposite the front face, a fiber Bragg grating layer having a front face and a back face opposite the front face, the front face of the fiber Bragg grating layer coupled to the back face of the corrodible layer, and a corrosion resistant material covering the back face and edges of the fiber Bragg grating layer;

providing light to the fiber Bragg grating layer;

detecting light reflected from the fiber Bragg grating layer;

determining a thickness of the corrodible layer based on the detected light reflected from the fiber Bragg grating layer, and determining a corrosion rate based on the determined thickness of the corrodible layer.

16. The method of claim 15, further comprising:

transmitting the determined thickness and the determined corrosion rate to a remote device via a wireless network.

17. The method of claim 16, wherein the transmitting occurs at least once per hour during operation of the corrosion sensor.

18. The method of claim 15, further comprising:

removing the corrosion sensor from the pipeline;

weighing the corrosion sensor; and determining an amount of material lost from the corrosion sensor due to corrosion.

19. The method of claim 18, further comprising:

validating the determined corrosion rate by comparing the determined corrosion rate and the determined amount of material lost.

20. The method of claim 15, wherein determining a thickness of the corrodible layer comprises determining the thickness at two or more instances in time; and wherein determining a corrosion rate is based on the determined thickness at two or more instances in time.

* * * * *